May 26, 1953
W. A. KUEBLER
2,639,902
DIGESTER TOWER
Filed April 7, 1950
3 Sheets-Sheet 1
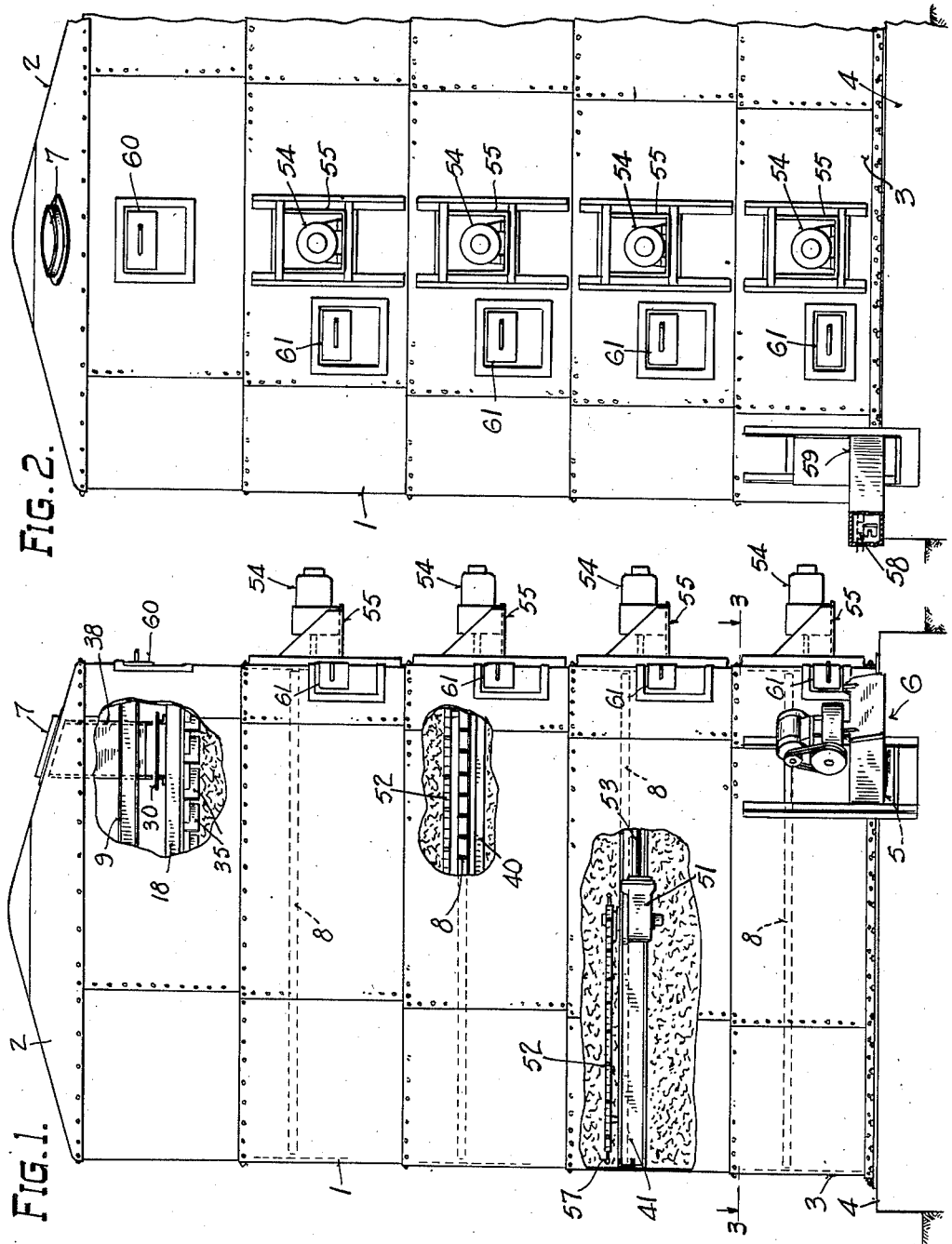
INVENTOR.
Walter A. Kuebler
BY
Andrus & Sceales
ATTORNEYS.

May 26, 1953  W. A. KUEBLER  2,639,902
DIGESTER TOWER

Filed April 7, 1950  3 Sheets-Sheet 2

INVENTOR.
Walter A. Kuebler
BY Andrus & Scales
ATTORNEYS.

May 26, 1953  W. A. KUEBLER  2,639,902
DIGESTER TOWER
Filed April 7, 1950  3 Sheets-Sheet 3
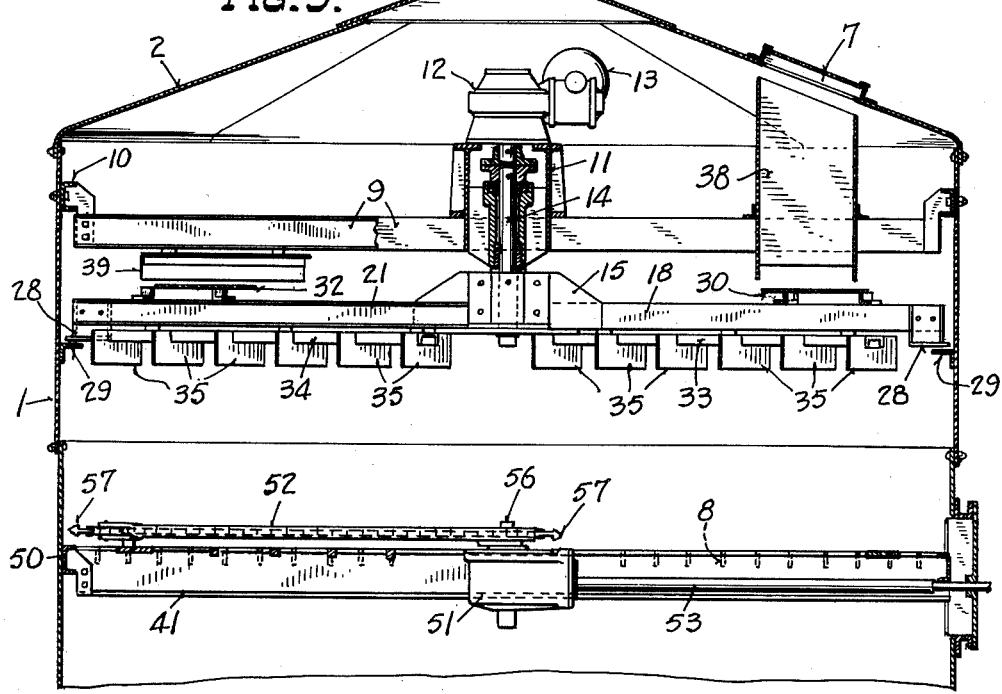
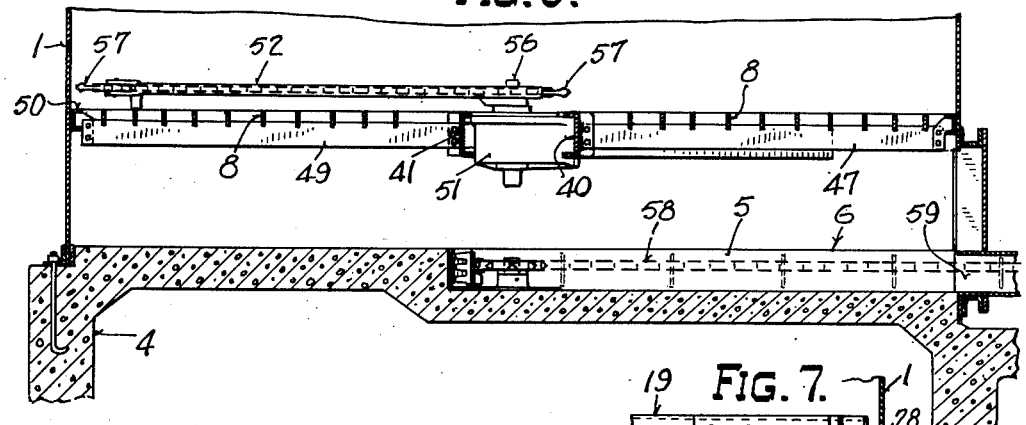
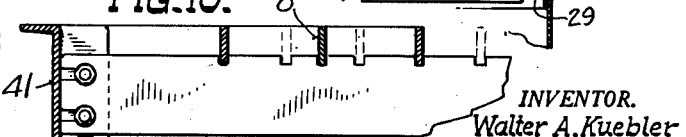
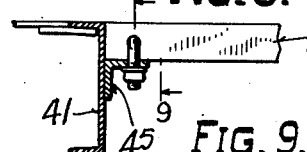
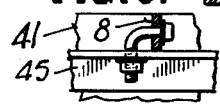
INVENTOR.
Walter A. Kuebler
BY
Andrus & Scales
ATTORNEYS.

Patented May 26, 1953

2,639,902

UNITED STATES PATENT OFFICE 2,639,902

DIGESTER TOWER

Walter A. Kuebler, Milwaukee, Wis., assignor to A. O. Smith Corporation, Milwaukee, Wis., a corporation of New York Application April 7, 1950, Serial No. 154,474

14 Claims. (Cl. 259—44)

This invention relates to a digester tank for use in connection with the production of organic fertilizer from organic waste materials.

In the proposed use of the structure of the invention a plurality of storage tanks may be utilized into which is placed organic waste materials such as manure, garbage, sewage sludge and waste from canning factories. While in the storage tanks the organic waste materials are inoculated with suitable aerobic bacteria in accordance with well-known practice. The storage tanks are connected by means of suitable transfer means with a mixing tank, whereby the inoculated organic waste material, after having been permitted to remain in the storage tanks for a length of time sufficient for the aerobic bacteria to have accomplished the desired purpose, is moved into the mixing tank where the organic material is thoroughly cut and ground to a relatively uniform size, and where, if desired, additional bacteria or chemical activators may be added.

The cut and ground material, after having been permitted to remain in the mixer for an appropriate length of time, is then transferred by suitable mechanical transfer means to the top of a digester tank into which heated air is introduced to complete the chemical action occurring within the organic waste materials, and in which said materials as it passes downwardly through the digester tank is dried sufficiently so that the same may be removed from the bottom of the tank by any suitable mechanical unloading means for use as organic fertilizer. The digester tank of the above briefly described assembly for the production of organic fertilizer is the subject to which this invention is directed.

Briefly the digester tank of the invention comprises a vertically disposed cylindrical tower fabricated from steel sheet material having bonded to either one or both surfaces thereof a lining of vitreous enamel. The digester is generally divided into a plurality of superposed zones or compartments between each of which is disposed a grid-like platform. The organic waste material as it progresses downwardly in its travel through the digester is retained by the platforms for the desired length of time, where, during its retention, the waste material is agitated to a degree sufficiently proper to expose the same to complete aeration and to permit substantially complete drying of the material in the lowermost compartment when it will then be suitable as organic fertilizer.

As stated above, the organic waste material from the mixer is loaded into the top of the digester tank and at this point the waste material is in a generally moist condition. In the prior art ingress of the waste material is generally accomplished through an ordinary opening or chute in the top of the digester and the waste material is generally permitted to fall immediately onto the uppermost grid. It has been found that handling the moist organic waste material in this manner will permit the same to ball-up or accumulate in a heavy pile which oftentimes resists the movement of agitator means therethrough to the point of causing a complete shut down of the digester. This invention provides a spreading or leveling device disposed near the top of the digester whereby a portion of the entering waste material is removed from beneath the bottom opening of the chute, is leveled off and spread to a substantially even depth on the uppermost grid. In distributing the moist waste material in this manner, heated air which is forced through the digester is distributed substantially evenly to all parts of the waste material resting on the grids thereby providing for substantially complete aeration of the same.

The invention also provides an independently operated mechanical agitator means for each compartment to forcibly agitate the waste material to permit complete aeration of the same and to cause it to drop progressively downwardly from the grid of one compartment to the next lower grid. By providing independent agitating means for each compartment, it is possible to not only control the degree of agitation of the waste material in each compartment, but in the event of failure of the agitator in one compartment the remainder of the agitators will continue to operate by virtue of each being independently operated. The agitator means, or transfer arms, as they will be designated hereafter, are provided with a plurality of outwardly disposed hook-shaped cutters or teeth which cut or dig their way into the waste material prior to the same being contacted by the transfer or unloader arm for movement of the material around and through the grids for disposition on successively lower grids.

A primary object of the invention is to provide a digester tower for the production of organic fertilizer from organic waste materials in which the waste materials in the several superposed compartments of the digester may be disposed therein for more effective and efficient aeration of the same.

Another object is to provide a digester tower having a material transporting and leveling device disposed in the upper portion of the tower for positively transporting a portion of the fed-in organic waste materials from beneath the feeding chute and disposing the same to a substantially equal depth over the surface of the uppermost grid between the two uppermost compartments of the digester.

Another object is to provide independently operating agitator or transfer means for each compartment of the digester.

A further object is to provide positive actuating means in combination with the transfer or unloading means to break up the waste material disposed on the respective grids to provide a path in front of the transfer or unloader arms prior to contact of the same with the waste material.

Another object is to provide a digester tower for the production of organic fertilizer from organic waste materials wherein controlled aeration of the waste material may be accomplished and in which substantially complete drying of the bacteria and chemically treated waste material is effected in the lowermost compartment of the digester.

Another object is to provide a digester tower for the production of organic fertilizer from organic waste materials which is highly efficient in operation and may be operated continuously at a relatively high rate of production of finished product.

These and other objects and advantages will appear hereinafter from reading the specification and drawing in which:

Fig. 1 is an elevational view of the digester tower of the invention with parts broken away to show certain apparatus disposed within the tower;

Fig. 2 is a fragmentary elevational view of the tower as viewed from the right in Fig. 1;

Fig. 5 is a vertical sectional view of the upper portion of the tower showing the delivery chute and spreader mechanism;

Fig. 6 is a vertical section of the lower end of the tower showing the elements of Fig. 3;

Fig. 7 is a detail section taken on line 7—7 of Fig. 4, showing a radial plow;

Fig. 8 is a detail section showing the grid bar end attachment;

Fig. 9 is a fragmentary section on line 9—9 of Fig. 8; and

Fig. 10 is a fragmentary view of a grid unit showing provision for extra grid bars.

Figure 3:
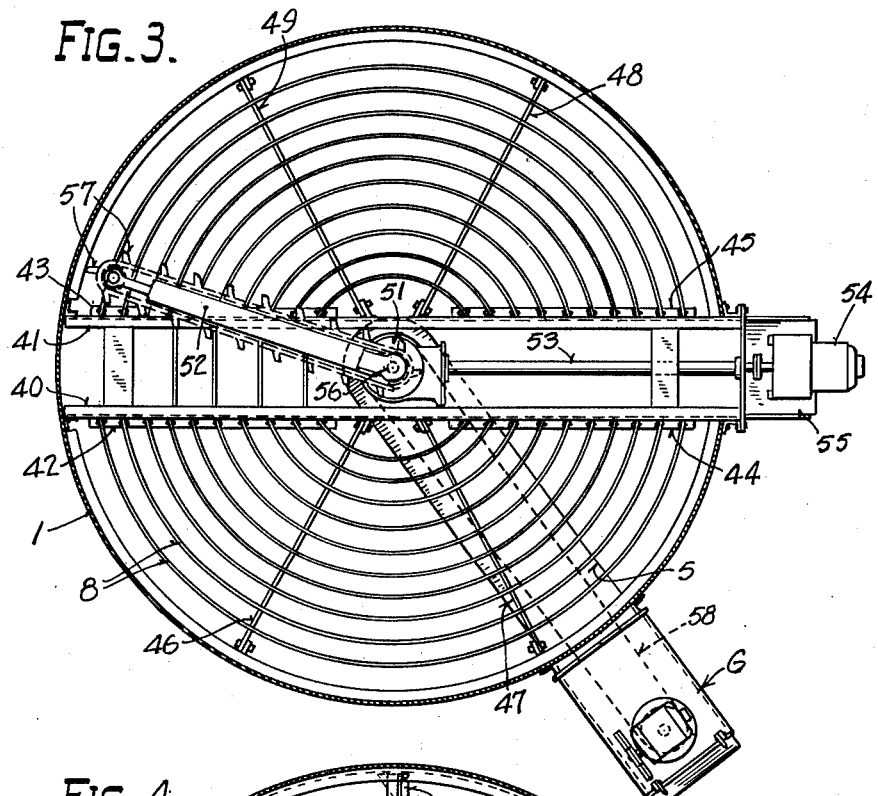
Fig. 3 is a transverse section of the tower taken on line 3—3 of Fig. 1 showing a grid assembly, transfer arm and unloader.

In accordance with the invention and with reference to the drawing, digester tower 1 may be fabricated to cylindrical shape from a plurality of metal sheets which may be covered on either one or both sides with a protective coating such as vitreous enamel, plastic or the like. The metal sheets may be plain or uncoated as well as coated, the criterion of choice being the protection needed to combat the corrosive effects of the acids of fermentation of the waste organic materials and the chemicals employed to accelerate fermentation of the same.

The sheets from which the digester tower is fabricated are joined end-to-end circumferentially as well as joined in superposed relationship to one another in accordance with known practice. A cover or roof 2 of generally dome-shape is secured to the uppermost circumferential edge of the top sheets to enclose the top of the tower while the bottom 3 of the tower is secured in a concrete foundation 4. A trough or passageway 5 is provided in the foundation for the reception of a bottom mechanical unloading device 6 which will be discussed more fully hereinafter. The usual ladder (not shown) is secured to the outside of the tower to provide means for ascending to the roof or to any intermediate point for any desired reason. The roof is provided with one or more opening 7 therein for the purpose of permitting delivery of waste material to the upper compartment of the digester.

In the embodiment of the invention herein shown and described the interior of the digester tower is divided into a plurality of zones or compartments by a plurality of axially spaced grids 8 of circular shape, the uppermost compartment being that portion of the tower into which the waste organic material is initially loaded while the remaining compartments are those in which the waste material is subjected to controlled procedure to produce organic fertilizer.

In the uppermost compartment there is located a spreader or leveling device assembly which functions to evenly distribute the incoming organic waste material over the grid disposed at the bottom of the compartment so that there will be no bulky piles of the waste material at any particular location on the grid. This of course permits a substantially even flow of heated air to all portions of the waste material and reduces any tendency for the air to follow certain paths, for instance through a spot on the grid where there happened to be a very little or none of the material loaded into the tower.

In the uppermost compartment a pair of spaced channel members 9 extend diametrically across the interior of the tower to support the leveling device structure and the motive mechanism for operating the same. The channel supporting members 9 are secured to the shell of the digester tower in any suitable manner, the means shown in the drawing being by way of brackets secured to the ends of the channel members 9 and which extend upwardly to U-shaped channel members 10 which receive the upper end of the brackets.

Pedestal 11 is located centrally of the interior of the shell and is secured in any suitable manner to the upper surface of support members 8. The upper portion of the pedestal 11 is flanged horizontally to provide a support for speed reducer 12 which is in turn connected to motor 13. The lower portion of the pedestal extends downwardly between channel members 9. Disposed within and extending vertically through the pedestal 11 is the drive shaft 14 which is connected to the speed reducer. The appropriate and necessary couplings, bearings, bushings and oil seals are employed and need not be described. These members may be seen to best advantage in Fig. 5.

A spider member 15 is keyed to the lower end of shaft 14 and is turned by the reduced speed of rotation of the shaft. A plurality of spaced arms 16, 17, 18, 19, 20 and 21 are secured to the spider 15 and extend radially from the spider to adjacent the interior surface of the shell of the tower. The arms are equally spaced about the circumference of the spider and each succeeding pair of arms, i. e. 16—17, 18—19, and 20—21 have disposed therebetween and secured thereto brace members 22, 23 and 24 which serve to brace the arms to which they are secured. The radially extending arms are further braced by virtue of having disposed therebetween and secured thereto pairs of channel brace members 25, 25' between arms 17 and 18; members 26, 26' between arms 19 and 20 and members 27, 27' between arms 16 and 21.

The outer ends of radial arms 16—21 have secured thereto shoe members 28 which serve as safety devices in that if the turntable becomes unevenly loaded with entering waste material, the shoe members will bear against and ride on angular member 29 which is secured substantially circumferentially to the inner surface of the shell of the digester. One leg of member 29 is disposed horizontally so that shoe members 28 may, if necessary, contact the same and be supported thereby.

A plurality of flat plates or platforms 30, 31 and 32 are disposed respectively between pairs of radial arms 17—18; 19—20; and 16—21 and are secured to the upper horizontally disposed legs of the pairs of channel braces 25, 25'; 26, 26'; and 27, 27'. The radial arms, braces, channel member braces and the platforms or plates being rigidly secured together form a compact unitary turntable structure which is rotatable in response to the rotation of speed reducer shaft 14 to which spider 15 is keyed.

Figure 4:
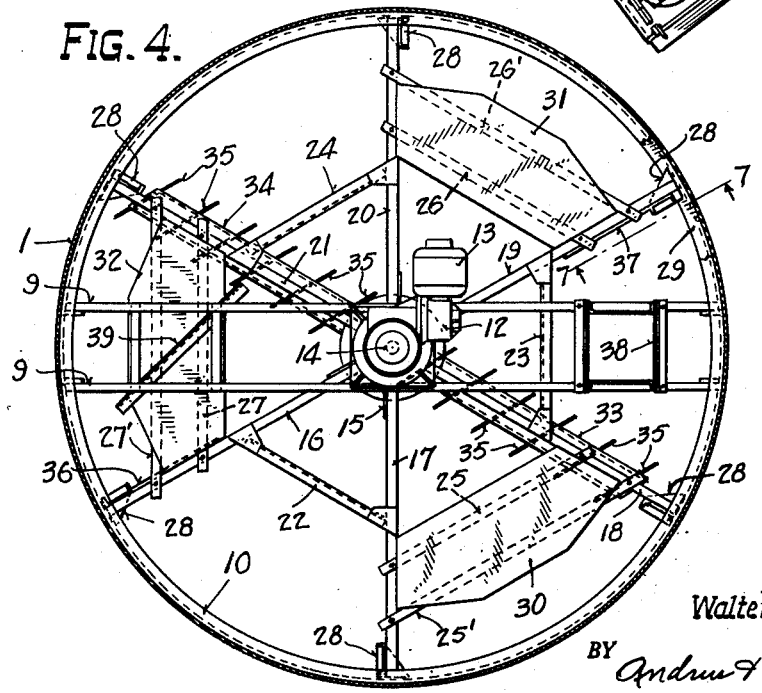
Fig. 4 is a top plan view of the spreader and leveling assembly disposed in the uppermost compartment of the digester tower, the tower being shown in section.

On the underside of oppositely disposed radial arms 18 and 21 there is secured in depending relationship to the radial arms, plate members 33 and 34. The plate members 33 and 34 have a plurality of angularly disposed depending fins or blades 35 secured thereto and extending to either side thereof. Likewise, radial plows may be secured to any of the radially extending arms 16—21 that are suitable for the purpose. In the embodiment of the invention shown in the drawing and herein described, radial plows 36 and 37 are secured to arms 16 and 19 respectively. See Figs. 4 and 7. These plows are rotatable with the turntable structure above described.

Having particular reference now to Fig. 5, delivery chute 38 comprising a box-like structure is disposed near one end of and between the channel supports 9, and extends from adjacent the opening in the cover, through the channel supports, and has its discharge end disposed near the plane of the plates or platforms 30, 31 and 32. At the opposite end of supports 9 and secured to the underside thereof in depending relationship thereto, is an angularly disposed scraper 39. The bottom edge of the scraper is closely adjacent the upper surfaces of plate or platform members 30, 31 and 32. The scraper serves to remove any waste material being carried on the plates or platforms.

In operation the spreader or leveling device functions in a manner now to be described. When waste organic material is loaded through an opening in the cover of the digester tower it will drop through the delivery chute 38 because the latter is disposed directly beneath the opening in the tower cover. With the motor 13 operating through the speed reducer 12 the shaft 14 will be rotated and will turn the turntable structure above described. As the turntable is rotated the equally spaced plates or platforms 30, 31 and 32 will sequentially pass beneath the discharge end of the delivery chute when the incoming waste material will be deposited thereon. During rotation of the turntable and at such times when none of the plates or platforms are moving under the discharge end of the chute the waste material will fall to the grid which separates the uppermost compartment from the compartment immediately below. As the turntable rotates, the waste organic material resting on the plates or platforms 30, 31 and 32 will be scraped therefrom by the stationary scraper 39 depending from the underside of one end of channel members 9. The waste material scraped from the platforms will fall to the above mentioned grid near the circumference thereof, and as it builds or piles up, the radial plows and fins or blades secured to rotating plate members 33 and 34 will co-operate to break up the mass of waste material and to divert the same toward the center of the digester tower so that as a result there will be a substantially even distribution of the waste material over the uppermost grid.

Thus the leveling or spreader device of the invention provides means which positively prohibits the disposition of the incoming waste material into a pile directly beneath the delivery chute and near the circumference of the grid. Were it not for the functioning of this particular structure the result would probably be a complete breakdown of the digester due to the fact that any mechanical agitator attempting to move the piled up mass of waste material would find it difficult if not impossible at times to get through the mass.

As hereinbefore stated, the digester tower comprises a number of compartments separated from each other by grids 8 of circular shape. A description of one of the grids will suffice for all of them because they are alike structurally. With reference to Figs. 3 and 8, it will be noted that a pair of channel shaped support members 40 and 41 extend diametrically from one side of the shell of the tower to the opposite side. The support members serve for mounting the gear box and transfer arm of a material transfer means, to be described later, and also as a mounting for the ends of the concentric grid bars. Angular brackets 42, 43, 44 and 45 are secured to the outer surfaces of channel supports 40 and 41 and serve as a mounting for the opposite ends of the circular grid bars. The grid bars do not extend across the channel supports but the latter are secured together for rigidity by lateral cross braces which extend from one support to the other.

A plurality of radial support bars 46, 47, 48 and 49 are secured at their inner ends to the outer surfaces of channel supports 40 and 41 and at their outer ends to a plurality of channel members 50 disposed circumferentially outwardly of the outer grid bars. The channel members 50 extend to a height substantially that of the grid bars and are secured in any suitable manner to the inner surface of the walls of the digester tower. The radial support bars are provided with a plurality of spaced notches in the upper edge thereof into which fit the concentric grid bars. The notches are spaced so that the openings between the grid bars of different widths may be obtained simply by selecting the proper notches. Therefore grid spacings of varying widths may be utilized for waste organic material of different texture or fineness.

As above stated, each compartment is provided with an unloader or transfer mechanism for successive movement of the waste material from one compartment to the next lower one. In view of the fact that all the unloader or transfer mechanisms are structurally alike a description of only one will be given.

The transfer mechanism comprises a gear housing 51 which is mounted along the vertical center line of the tower between the channel supports 40 and 41. The housing 51 encloses appropriate gearing and shafting to operate a transfer arm 52 which is disposed a short distance above the grid. A driven shaft 53 extends from the gear housing 51, between channel supports 40 and 41 and is driven by a motor 54 mounted outside the wall of the digester tower on brackets 55. Through appropriate gearing, vertical shaft 56 having a sprocket mounted on the upper end thereof drives a chain having hook-shaped teeth 57 secured thereto, around the perimeter of transfer arm 52. An idle sprocket gear for receiving the chain is suitably mounted at the outer end of the transfer arm.

The transfer arm extends from the center of the digester tower to substantially the outer ring of the grid bars and sweeps slowly in a circular path over the grid bars. Simultaneously with the slow sweeping circular movement of the transfer arm the teeth 57 are being driven relatively fast around the perimeter of the arm as above described. The function of the fast moving hook-shaped teeth is to cut a path in the organic material resting on the grids prior to contact of the transfer arm with the material. By virtue of the operation of the mechanism just described there is little if any likelihood of the transfer arm becoming jammed because of its inability to forge its way through the waste material. As the transfer arm sweeps rather slowly through the waste material it not only breaks it up, allowing better aeration of the same, but the arm also forces the treated material through the grid bars to the next lower compartment.

The transfer arm may be provided with depending teeth which extend downwardly for a short distance to the grid bars so that if there is any tendency for the waste material to clog between the grid bars, the depending teeth will loosen the same and permit the same to drop to the next lowest compartment. In the event that clogging or wadding of the waste material occurs around the teeth 57, the motor 54 may be reversed which will then reverse the direction of travel of the teeth and thus free them from material that has wadded around the teeth.

In the embodiment of the invention herein described, four transfer arms are shown but any number may be used which will depend on the number of compartments in the digester tower. The transfer arms also may be rotated at different speeds as may the chain and the teeth disposed about the perimeter of the transfer arm. If desired, the transfer arm may be rotated in opposite directions, it only being necessary to reverse the position of the teeth 57 on the arm or arms which are to rotate in a clockwise direction as distinguished from the position of the teeth, best shown in Fig. 3.

In the lowermost compartment of the digester tower a mechanical unloader 58 is disposed in the trough 5 for unloading the completely processed fertilizer. The power unit for operating the unloader is positioned outside the tower as are the motors 54 for operating the transfer arms 52. The unloader discharges the processed material into suitable containers, not shown, from the bottom of the tower through opening 59 and corresponds to that described and claimed in the co-pending application of Julius Tiedeman, Ser. No. 98,794, which is assigned to the assignee of the present invention. It is generally practical and advisable to co-ordinate the operation of the bottom transfer arm and the bottom unloader so that they operate in unison to clear the lowermost compartment of the finished product.

Opening 60 is provided through the wall of the tower in the uppermost compartment so that easy access may be had to the structure of the leveling device. Openings 61 are likewise provided at each compartment level for access to the transfer arms and the unloader.

As hereinbefore stated, it is highly desirable and advantageous to operate the transfer arms independently of one another. Were all the transfer arms rotated from a single shaft the inability of any particular arm to pass through the material disposed on the grid surfaces would stop the entire unit. Likewise the scope of control and selection of speeds of rotation and direction of travel of the respective transfer arms is susceptible of wide variation with the independently mounted and operated structure above described. Another feature of the invention made possible by the structure of the transfer mechanism is the cutting and clearing action of the teeth 57 prior to contact of the transfer arm 52 with the waste material being processed. By virtue of the cutting and loosening action of the teeth there is appreciably very little resistance to the slowly rotating transfer arms as they move through the waste material.

A suitable inlet for heated air is located at the bottom of the digester tower where air is forced by pressure upwardly through the mass of material being processed. Provision is also made for expelling a portion of the spent air and gases generated within the tower during processing. The outlets for the spent air and gases may be located at predetermined levels of the tower. Temperature recording devices may likewise be located at each compartment of the digester for checking of temperatures as well as openings to sample the condition of the waste material at any stage of the process. The detail structure of the various members just referred to are not shown because they are known to the art.

The operation of the various mechanical members disposed within the digester tower have been described throughout the specification. In the embodiment of the invention shown in the drawing and described in the specification the digester tower comprises four processing zones or compartments. In the uppermost zone the incoming waste organic material may be considered as being prepared for subsequent processing in the lower compartments in that the incoming material is spread evenly over the uppermost grid of the structure thereby obviating the possibility of setting up paths of least resistance for the heated air to follow without obtaining the benefit of aeration. Tests have shown, after the evenly deposited material has been transferred to the next two lower compartments by the independently operated and positively actuated transfer mechanisms, that a marked degree of chemical action occurs in these compartments. The action in the lowermost compartment is one of drying the material prior to its being unloaded from the tower.

The digester tower of this invention may, if desired, be run for batch production of the finished product although the more preferable use, and the one which has been proven successful from actual tests, is that the tower and its attendant equipment are admirably adapted to be run continuously. In pretreating the waste material with aerobic bacteria and chemicals in the storage tanks and in the mixer the production rate of organic fertilizer is substantially increased over that in which all bacterial and chemical action is permitted to take place in one vat or tank—in fact, it is known that some of the early processes take several weeks to complete a batch. In the present invention, however, in which the waste material is at least partially pretreated and then brought to a uniformly even depth by the leveling structure of the invention together with the positive transfer of the material by independently operated transfer mechanisms, there is provided equipment which is not likely to fail during the time that the equipment is in operation.

By virtue of the independent drives for the respective transfer means there is provided a wide range of operating possibilities in the treatment of the organic waste material. For instance, the transfer means may all be driven at the same speed and rotated in the same direction, the transfer means all may be rotated in the same direction but be driven at predetermined selected speeds or the transfer means may be driven in reverse directions of rotation with respect to one another, and at the same or different speeds. This wide selection of operation of the transfer means provides a nicety of control pertaining to all the waste material within the housing or to any selected portion of the material in one or more of the compartments of the tower.

Various embodiments of the invention may be employed within the scope of the accompanying claims.

I claim:

1. A digester tower for the production of organic fertilizer from waste organic material comprising an upstanding cylindrical housing, grid members disposed at vertically spaced intervals within said housing to provide within the latter a series of compartments for the treatment of the material, rotatable means disposed within the uppermost compartment to cause the waste material therein to be deposited upon the uppermost grid to an even depth, rotatable means disposed within each compartment near the bottom thereof for transferring the material therein successively to the next lower compartment, means extending across said housing at the level of each grid for centrally and substantially independently supporting each corresponding last named rotatable means, means to drive each said rotatable means separately, and mechanical means disposed within the lowermost compartment of the tower for removing the treated material therefrom.

2. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, independently mounted and operable means disposed within each compartment in proximity to the corresponding grid member constituting the bottom of the compartment for transferring the waste material therein successively to the next lower compartment, mechanical means disposed within the lowermost compartment for removing the material therefrom, and independent motive means for each transfer means and the unloading means disposed outside the housing.

3. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, a scraper disposed above and in close proximity to the plane of the upper surface of each said platforms to remove successively, as the latter is rotated, the waste material from the platforms for disposition of the material on the underlying grid, independently mounted and operable means disposed within each compartment in proximity to said grid members for transferring the waste material disposed thereon to the next lower grid member, mechanical unloading means disposed within the lowermost compartment for removing the treated material therefrom, and independent motive means for each said transfer means and the unloading means, said motive means being disposed outside the housing to operate drive shafts extending through the wall of the housing.

4. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, means to rotate said turntable disposed above the latter and mounted on spaced channel members extending diametrically of the housing and secured to the walls thereof, a scraper secured to the channel members and angularly disposed with respect thereto and above the rotatable platforms for removing successively waste material disposed thereon toward the vertical centerline of the housing for disposition of the material on the underlying grid, independently mounted and operable means disposed within each compartment in proximity to said grid members for transferring the waste material disposed thereon to the next lower grid member, mechanical unloading means disposed within the lowermost compartment for removing the treated material therefrom, and independent motive means for each said transfer means and the unloading means, said motive means being disposed outside the housing and secured thereto to operate driving means extending through the wall of the housing.

5. A digester tower for the production of organic fertilizer from waste organic material comprising a vertically disposed cylindrical housing, grid members disposed at vertically spaced intervals within the housing to provide within the latter a series of compartments for the treatment of the material, a turntable disposed for rotation within the uppermost compartment comprising a plurality of spaced radially extending support members, a plurality of equally spaced platforms secured to the upper surfaces of adjoining pairs of certain of the support members for receiving a portion of waste material fed into said housing, a scraper disposed above and in close proximity to the plane of the upper surface of each said platform, to remove successively, as the latter is rotated, the waste material from the platforms for disposition of the material on the underlying grid, a plurality of angularly disposed fins secured to the under surface of a plurality of oppositely disposed radial support members to provide for leveling of the waste material deposited on the underlying grid, said fins being so disposed and acting in concert with the scraper to provide for movement of the waste material toward the vertical center line of the tower, means disposed within the tower and above the turntable to rotate the latter, transfer means disposed within each compartment in proximity to the plane of the upper surface of the grids for transferring the waste material disposed thereon to the next lower grid, independent motive power means for rotating each said transfer means, said power means being disposed on support brackets secured to the outer surface of the tower wall to operate drive shafts extending through the wall of the tower and into the tower, mechanical unloading means disposed within the lowermost compartment of the tower to remove the treated material therefrom, and motor power means disposed outside the tower for driving the unloader in unison with the lowermost transfer means.

6. A digester tower for the production of organic fertilizer from waste organic material comprising an upstanding cylindrical housing, grid members disposed at vertically spaced intervals within said housing to provide within the latter a series of compartments for the treatment of the material, rotatable means disposed within the uppermost compartment to cause the waste material therein to be deposited upon the uppermost grid to an even depth, independently mounted and rotatable transfer means disposed within each said compartment for transferring the material from the upper surface of the grids to the next lower grid comprising a rotatable arm of a length substantially the radius of the tower and operable about the vertical centerline of the tower to provide radial and downward movement of the material disposed on the adjacent underlying grid, separate power means to operate each said transfer means, said power means being disposed outside the tower, and unloading means disposed in the lowermost compartment for removing the treated material therefrom.

7. A digester tower for the production of organic fertilizer from waste organic material comprising an upstanding cylindrical housing, grid members disposed at vertically spaced intervals within said housing to provide within the latter a series of compartments for the treatment of the material, rotatable means disposed within the uppermost compartment to cause the waste material therein to be deposited upon the uppermost grid to an even depth, a pair of spaced supporting members secured to the inner surfaces of substantially diametrically opposed walls of each compartment, a speed reducer disposed upon each pair of supporting members at substantially the vertical centerline of the tower, a radial transfer arm disposed above each speed reducer and operable thereby, said transfer arm extending from the speed reducers to substantially the wall of the tower to provide radial and downward movement of the waste material on the underlying grid, drive shafts disposed horizontally and extending from the speed reducers through the wall of the tower, independently controlled motive means coupled to the respective shafts for each transfer arm to operate the same, support means for the motive means secured to the outer surface of the wall of the tower, unloading means disposed within the lowermost compartment of the tower to remove the treated material therefrom, and motive power for operating the unloading means.

8. A digester tower for the production of organic fertilizer from waste organic material comprising an upstanding cylindrical housing, grid members disposed at vertically spaced intervals within said housing to provide within the latter a series of compartments for the treatment of the material, rotatable means disposed within the uppermost compartment to cause the waste material therein to be deposited upon the uppermost grid to an even depth, independently mounted and rotatable transfer means radially disposed within each compartment for transferring the material therein successively to the next lower compartment, each said transfer means comprising a radial arm extending from the vertical centerline of the tower to substantially the wall thereof and having rotatable means disposed about the perimeter of said arm to cut into the waste material deposited on the grid to provide a path in front of the rotating radial arm prior to contact of the arm with the material, means to rotate the radial arms, unloading means disposed within the lowermost compartment for removing the treated material from the tower, and power means disposed outside the wall of the tower for operating the unloading means.

9. A digester tower for the production of organic fertilizer from waste organic material comprising an upstanding cylindrical housing, grid members disposed at vertically spaced intervals within said housing to provide within the latter a series of compartments for the treatment of the material, rotatable means disposed within the uppermost compartment to cause the waste material therein to be deposited upon the uppermost grid to an even depth, independently mounted and rotatable transfer means radially disposed within each compartment for transferring the material therein successively to the next lower compartment, each said transfer means comprising a radial arm extending from the vertical centerline of the tower to substantially the wall thereof and having rotatable means disposed about the perimeter of said arm to cut into the waste material deposited on the grid to provide a path in front of the rotating radial arm prior to contact of the arm with the material, comprising a plurality of hook-shaped teeth secured to an endless chain, means to rotate the transfer means and the endless chain having the teeth secured thereto, unloading means disposed within the lowermost compartment for removing the treated material from the tower, and power means for operating the unloading means.

10. A digester tower for the production of organic fertilizer from waste organic material comprising a cylindrical housing and a roof therefor, a chute disposed in the roof, grid members disposed at vertically spaced intervals within said housing to provide within the latter a series of compartments for the treatment of said material, a plurality of spaced supporting members secured to substantially diametrically opposed walls of the housing and disposed within the uppermost compartment, motive power and speed reducing means disposed on the supports, a shaft depending from the speed reducing means and having keyed to the bottom end thereof a turntable comprising a plurality of radially disposed arms, a plurality of platforms secured to the upper surfaces of certain pairs of the arms for the reception of a portion of the waste material fed into the tower through the chute as the turntable passes beneath the outlet end of the chute, a scraper secured to the underside of said supporting members and disposed at an angle thereto to scrape the waste material from the platforms as they rotate beneath the scraper, a plurality of leveling devices secured to the underside of certain of the radial arms of the turntable and being provided with a plurality of angularly disposed fins for leveling the material to a substantially uniform depth on the uppermost grid, said scraper and fins providing for movement of the waste material toward the vertical centerline of the tower, transfer arms disposed within each compartment disposed above the grid therein comprising a rotatable radially disposed arm extending from the vertical centerline of the tower to substantially the wall thereof and operatively connected to speed reducing means disposed at the inner end of the arm and supported on spaced supports extending substantially diametrically of the tower and secured to the wall thereof, rotatable means disposed about the perimeter of said arm to cut into the waste material deposited on the grid to provide a path in front of the rotating transfer arm prior to contact of the arm with the material comprising a plurality of teeth secured to an endless chain, a plurality of separate means to rotate each said transfer arm, unloading means to remove the treated material from the lowermost compartment and motive means to actuate the unloading means.

11. A digester tower for the production of organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, rotatable transfer means disposed within the housing in proximity to said grid members for transferring the waste material therein successively to the next lower compartment, a plurality of means disposed outside the housing to operate the transfer means, said operating means being adapted to be driven at predetermined speeds and directions of rotation, unloading means disposed within the lowermost compartment for removing the treated material therefrom, and motive means disposed outside the housing to operate the unloading means.

12. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, means to rotate said turntable disposed above the latter and mounted on spaced channel members extending diametrically of the housing and secured to the walls thereof, a scraper secured to the channel members and angularly disposed with respect thereto and above the rotatable platforms for removing successively waste material disposed thereon toward the vertical centerline of the housing for disposition of the material on the underlying grid, a plurality of transfer means disposed in the respective compartments and adapted for rotation to transfer the material on said grids toward the vertical centerline of the housing and simultaneously to the underlying grid, means to operate the transfer means, unloading means disposed within the lowermost compartment for removing the treated material therefrom, and motive means to operate the unloading means.

13. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, a scraper disposed above and in close proximity to the plane of the upper surface of each said platform, a plurality of fins secured to the underside of the rotatable platform, said scraper and said fins being so disposed as to divert the waste material in the uppermost compartment toward the vertical centerline of the housing to cause the waste material to be deposited to a substantially even depth on the uppermost grid, transfer means disposed for rotation in each compartment of the housing for transferring the material therein to the next lower compartment, means to operate the transfer means, unloading means disposed within the lowermost compartment for removing the treated material from the housing, and means to operate the unloading means.

14. A digester tower for the production of organic fertilizer from waste organic material comprising a vertically disposed cylindrical housing, grid members disposed at vertically spaced intervals within the housing to provide within the latter a series of compartments for the treatment of the material, means disposed within the uppermost compartment to cause the waste material therein to be deposited to an even depth upon the uppermost grid comprising a rotatable turntable provided with a plurality of equally spaced platforms secured thereto for receiving a portion of the waste material fed into said housing, a scraper disposed above and in close proximity to the plane of the upper surface of each said platform, a plurality of fins secured to the underside of the rotatable platform, said scraper and said fins being so disposed as to divert the waste material in the uppermost compartment toward the vertical centerline of the housing to cause the waste material to be deposited to a substantially even depth on the uppermost grid, transfer means disposed for rotation in each compartment of the housing for transferring the material therein to the next lower compartment, means to operate the transfer means comprising motive power disposed outside the housing and adapted to rotate the transfer means at predetermined speeds and directions of rotation, unloading means disposed within the lowermost compartment, and means to operate the same, said unloading operating means being disposed outside the housing of the tower.

WALTER A. KUEBLER.

References Cited in the file of this patent

UNITED STATES PATENTS

| Number | Name | Date |
|---|---|---|
| 2,031,122 | Mueller | Feb. 18, 1936 |
| 2,078,955 | Lipscomb | May 4, 1937 |
| 2,178,818 | Earp-Thomas | Nov. 7, 1939 |
| 2,593,867 | Eweson | Apr. 22, 1952 |

FOREIGN PATENTS

| Number | Country | Date |
|---|---|---|
| 123,646 | Great Britain | Mar. 6, 1919 |
| 479,977 | Great Britain | Feb. 15, 1938 |